US009459905B2

United States Patent
Anand et al.

(10) Patent No.: US 9,459,905 B2
(45) Date of Patent: *Oct. 4, 2016

(54) IMPLEMENTING DYNAMIC SRIOV VIRTUAL FUNCTION RESIZING

(71) Applicant: International Business Machines Corporation, Armonk, NY (US)

(72) Inventors: Manu A. Anand, Hyderabad (IN); Charles S. Graham, Rochester, MN (US); Timothy J. Schimke, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1 day.

This patent is subject to a terminal disclaimer.

(21) Appl. No.: 14/572,182

(22) Filed: Dec. 16, 2014

(65) Prior Publication Data

US 2016/0170789 A1 Jun. 16, 2016

(51) Int. Cl.
G06F 9/455 (2006.01)
G06F 9/46 (2006.01)
G06F 13/00 (2006.01)
G06F 13/28 (2006.01)
G06F 9/26 (2006.01)
G06F 9/34 (2006.01)
G06F 13/42 (2006.01)

(52) U.S. Cl.
CPC ....... G06F 9/45558 (2013.01); G06F 13/4221 (2013.01); *G06F 2009/45579* (2013.01); *G06F 2009/45583* (2013.01)

(58) Field of Classification Search
None
See application file for complete search history.

(56) References Cited

U.S. PATENT DOCUMENTS 8,639,858 B2 * 1/2014 Craddock ........... G06F 12/1009
710/22

(Continued)

FOREIGN PATENT DOCUMENTS

WO WO2010118230A1 A1 10/2010

OTHER PUBLICATIONS

IPCOM000172526D, "Virtual Function Number Assignment" IBM, Jul. 11, 2008.

(Continued)

*Primary Examiner* — Van Nguyen
*Assistant Examiner* — Melissa Alfred
(74) *Attorney, Agent, or Firm* — Joan Pennington

(57) ABSTRACT

A method, system and computer program product are provided for implementing dynamic configuration of a Single Root Input/Output Virtualization (SRIOV) virtual function in a virtualized system. A management function, a hypervisor, a hypervisor based PF device driver and a partition based virtual function (VF) device driver are used to implement usage based VF resizing. The management function periodically queries the SRIOV adapter for activity statistics for every assigned virtual function. The management function builds a usage heuristic based on these statistics and calculates VF resource usage based on these statistics. The usage information determines whether VF resources need to be scaled-up or scaled-down. A corresponding resize event is generated and send by the management function to both the hypervisor based PF device driver and partition based VF device driver. Both the PF and VF device drivers scale to the corresponding VF resource of the resize event.

10 Claims, 7 Drawing Sheets

(56) References Cited

U.S. PATENT DOCUMENTS

| | | | |
|---|---|---|---|
| 2003/0005070 A1* | 1/2003 | Narasimhamurthy | G06F 12/063 709/213 |
| 2010/0058342 A1* | 3/2010 | Machida | G06F 9/5077 718/1 |
| 2012/0185632 A1 | 7/2012 | Lais et al. | |
| 2013/0042086 A1* | 2/2013 | Cardona | G06F 12/0284 711/173 |

OTHER PUBLICATIONS

IPCOM000231850D, "Single Route I/O Virtualization—Dynamic Network Optimizer" IBM, Oct. 9, 2013.

Liu, Jiuxing, "Evaluating Standard-Based Self-Virtualizing Devices: A Performance Study on 10 GbE NICs with SR-IOV Support", INSPEC/IEEE, 2010.

Appendix P—List of IBM Patents or Patent Applications Treated as Related—May 1, 2015.

* cited by examiner

100

ADAPTER LEVEL SETTINGS 170

ENABLE RESIZE 171
RESIZE POLL INTERVAL 172
RESIZE POLL FREQUENCY 173
RESIZE POLICY 174   (SIMPLE FIXED RESIZE SIZE %, MEDIUM FIXED MULTIPLE OF 5, AGGRESSIVE NEXT FIXED MULTIPLE OF 25)
MAX SCALE DOWN FAILURE COUNT 175
MAX SCALE UP FAILURE COUNT 176
RESIZE RATIO 177

VIRTUAL FUNCTION (VF)  SETTINGS 180

IS-RESIZABLE 181
SCALE DOWN POLICY 182
SCALE DOWN THRESHOLD 183
SCALE UP POLICY 184
SCALE UP THRESHOLD 185

HARDWARE FACILITIES & FUNCTIONS 186

USAGE STATISTICS CHECK AGENT 187
SCALE UP AND SCALE DOWN EVENT COMMANDS 188
DMA WINDOWS 190 FOR EACH ACTIVE SRIOV VF, PF & VF DRIVERS
MMIO WINDOWS 192 FOR EACH ACTIVE SRIOV VF, PF & VF DRIVERS

FIG. 1B

IMPLEMENTING DYNAMIC SRIOV VIRTUAL FUNCTION RESIZING

FIELD OF THE INVENTION

The present invention relates generally to the data processing field, and more particularly, relates to a method, system and computer program product for implementing dynamic resizing of a Single Root Input/Output Virtualization (SRIOV) virtual function in a SRIOV adapter.

DESCRIPTION OF THE RELATED ART

Single root input/output (IO) virtualization (SRIOV) is a PCI standard, providing an adapter technology building block for I/O virtualization within the PCI-Express (PCIe) industry. SRIOV capability is a feature of many new PCIe adapters for Fibre Channel, Ethernet, Infiniband, and Converged Network Adapters (CNA).

The SRIOV adapter has an I/O adapter virtualization architecture that allows a single I/O adapter to be concurrently shared across many different logical partitions. The sharing is done at a physical level, so that each logical partition has access to a slice of the physical adapter. The sharing is accomplished via partitioning the adapter into many different PCI functions, and then distributing access to those functions. The adapter is presented as one or more physical functions (PFs) that control functions, for example used for both configuration and I/O, and a set of virtual functions (VFs), used for I/O and limited configuration, each VF represents a slice of the adapter capacity that can be assigned to a logical partition independently of other VFs. Each logical partition has a device driver for each of the VFs assigned to the logical partition.

A need exists for an effective mechanism to implement dynamic resizing of a Single Root Input/Output Virtualization (SRIOV) virtual function in a virtualized system. It is desirable that such mechanism enables effective and efficient utilization of adapter and hypervisor resources associated with a SRIOV virtual function based upon the VF usage.

SUMMARY OF THE INVENTION

Principal aspects of the present invention are to provide a method, system and computer program product for implementing dynamic resizing of a Single Root Input/Output Virtualization (SRIOV) virtual function in a virtualized system. Other important aspects of the present invention are to provide such method, system and computer program product substantially without negative effects and that overcome many of the disadvantages of prior art arrangements.

In brief, a method, system and computer program product are provided for implementing dynamic resizing of a Single Root Input/Output Virtualization (SRIOV) virtual function in a SRIOV adapter. A management function, a hypervisor, a hypervisor based PF device driver and a partition based virtual function (VF) device driver are used to implement usage based VF resizing. The management function periodically queries the SRIOV adapter for activity statistics for every assigned virtual function. The management function builds a usage heuristic based on these statistics and calculates VF resource usage based on these statistics. The usage information determines whether VF resources need to be scaled-up or scaled-down. A corresponding resize event is generated and send by the management function to both the hypervisor based PF device driver and partition based VF device driver. Both the PF and VF device drivers scale to the corresponding VF resource of the resize event.

In accordance with features of the invention, in case errors are encountered during a resize event, the VF resources remain unchanged.

BRIEF DESCRIPTION OF THE DRAWINGS

The present invention together with the above and other objects and advantages may best be understood from the following detailed description of the preferred embodiments of the invention illustrated in the drawings, wherein:

FIGS. 1A and 1B, and FIG. 2 illustrates a respective example computer system and example system for implementing dynamic resizing of a Single Root Input/Output Virtualization (SRIOV) virtual function (VF) in a SRIOV adapter in accordance with the preferred embodiment;

DETAILED DESCRIPTION OF THE PREFERRED EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In accordance with features of the invention, a method, system and computer program product are provided for implementing dynamic resizing of a Single Root Input/Output Virtualization (SRIOV) virtual function (VF) in a SRIOV adapter.

Figure 1A:
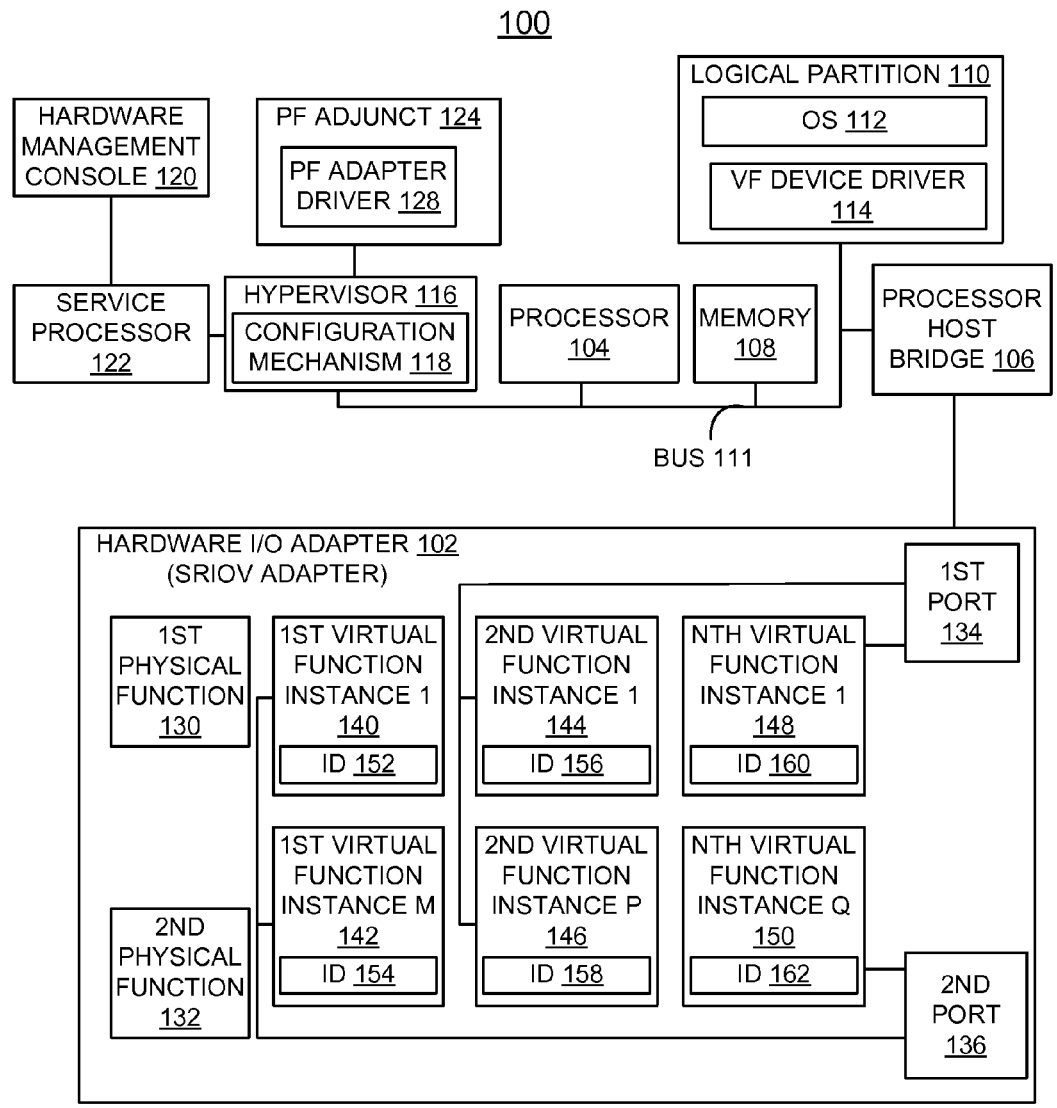

Having reference now to the drawings, in FIGS. 1A and 1B, there is shown an example computer system generally designated by the reference character 100 for implementing dynamic resizing of a Single Root Input/Output Virtualization (SRIOV) virtual function (VF) in a SRIOV adapter 102 in accordance with the preferred embodiment. Computer system 100 includes one or more processors 104, or central processor units (CPUs) 104 (one shown) coupled by an I/O hub or processor host bridge 106 to the Single Root Input/Output Virtualization (SRIOV) adapter or hardware I/O adapter 102.

Computer system 100 includes a memory 108 and one or more logical partitions (LPARs) 110 (one shown) coupled by a system bus 111 to the processor 104 and the processor host bridge 106. Each operating system (OS) 112 resides in its own LPAR 110, with each LPAR allocated a part of a physical processor 104, an entire physical processor, or multiple physical processors from the computer 100. A VF device driver 114 is provided with the logical partition (LPAR) 110. A portion of the memory 108 is allocated to each LPAR 110. Computer system 100 includes a hypervisor 116 including a configuration mechanism 118. The hypervisor 116 is a part of the system firmware and manages the allocation of resources to each operating system 112 and LPAR 110.

As shown, a hardware management console (HMC) 120 used, for example, to manage system functions including logical partition configuration, is coupled to the hypervisor 116 via a service processor 122. Computer system 100 includes a physical function (PF) manager or PF adjunct 124 provided with the hypervisor 116. The PF adjunct 124 includes an adapter driver 128 to manage physical functions of the hardware I/O adapter 102. The hypervisor 116 uses the PF adjunct 124, for example, to configure physical functions (PFs) and virtual functions (VFs) of the hardware I/O adapter 102, for example, based on configuration information provided by a system administrator via the hardware management console 120, and for dynamic virtual function (VF) resizing based on VF usage in accordance with the invention.

As shown, the hardware I/O adapter 102 includes, for example, a first physical function 130, a second physical function 132, a first port 134, and a second port 136. The hypervisor 116 using the PF adjunct 124 configures virtual functions based on the physical functions 130, 132 and associates virtual functions with one or more of the ports 134, 136 of the hardware I/O adapter 102.

For example, a first virtual function, 140, instance 1, and the Mth instance of the first virtual function 142, where M is greater than 1, are associated with the second port 136. As shown, a second virtual function 144, such as the first instance of the second virtual function 144 and the Pth instance of the second virtual function 146, where P is greater than 1, are associated with the first port 134. As shown, multiple instances of an Nth virtual function, where N is greater than 2, such as the first instance of the Nth virtual function 148 is associated with the first port 134 and the Qth instance of the Nth virtual function 150, where Q is greater than 1, is associated with the second port 136.

Each instance of the first virtual function 140, 142, the second virtual function 144, 146, and Nth virtual function 148, 150 are hosted by a physical function, such as one of the first physical function 132, the second physical function 132, and another physical function (not shown).

Each instance of the first virtual function 140, 142, the second virtual function 144, 146, and Nth virtual function 148, 150 includes a respective virtual function identifier (ID), shown as ID 152, ID 154, ID 156, ID 158, ID 160, and ID 162. Each virtual function identifier uniquely identifies a particular virtual function that is hosted by the hardware I/O adapter 102. For example, when a message (not shown) is routed to a particular virtual function, the message includes the identifier associated with the particular virtual function.

Referring to FIG. 1B, there are shown example adapter level settings 170 for implementing dynamic resizing of a Single Root Input/Output Virtualization (SRIOV) virtual function (VF) in a SRIOV adapter 102 in accordance with the preferred embodiment. As shown, the adapter level settings 170 apply to all re-sizable virtual functions including an enable resize 171, a resize poll interval 172, a resize poll frequency 173, a resize policy 174, a max scale down failure count 175, a max scale up failure count 176, and a resize ratio 177.

The enable resize setting 171 governs whether resizing of VFs is enabled or not. If the enable resize setting 171 is disabled, the adapter level re-size settings and VF level re-size settings are disabled. The resize poll interval 172 is a resizing heartbeat, such as set values of 1 minute, 5 minutes and 10 minutes. The resize poll interval 172 is the interval at which the management function polls the SRIOV adapter 102 for VF statistics.

The resize poll frequency 173 includes a number of consecutive resize intervals to be tracked before making a decision whether to resize a VF. The resize policy 174 includes for example a simple policy with resources resized by a fixed percentage, such as 25% every time; a medium policy with resources resized by a fixed factor, such as the next multiple of 5; and an aggressive policy with resources resized by a fixed factor, such as the next multiple of 25.

The max scale down failure count 175 is a maximum number of consecutive failures allowed for scale down operations. In case of number of consecutive failures exceed this value 175, the VF is marked as non-resizable for scale-down, and the VF resources are fixed after this point. The max scale up failure count 176 is a maximum number of consecutive failures allowed for scale up operations. In case of number of consecutive failures exceed this value 176, the VF is marked as non-resizable for scale-up, and the VF resources are fixed after this point. The resize ratio 177 is a setting that governs the weight given for DMA and MMIO buffers usage for resize calculations. For example, default value of 50% is set for DMA and MMIO. This means that while determining usage information, both DMA and MMIO will be given equal weight.

Example virtual function settings 180 are shown for implementing dynamic resizing of a Single Root Input/Output Virtualization (SRIOV) virtual function (VF) in a SRIOV adapter 102 in accordance with the preferred embodiment. The virtual function settings 180 include an is-resizable setting 181 that governs whether the VF is re-sizable or not.

A scale down policy 182 must be specified for all virtual functions that want to donate extra resources back to the adapter 102 and hypervisor 116, for example, the user may select one of the three policies described for the resize policy 174.

A scale down threshold setting 183 is enabled only when a scale down policy is selected, and this value indicates the minimum threshold resources percentage for a scale down operation. No scale down is permitted if it reduces the resources below this threshold setting 183. The value of the scale down threshold setting 183 is relative to original resources allocated to this VF, and for example, defaults to 10% of an original VF resource allocation. This means that at the very minimum a SRIOV virtual function may be scaled down to 10% of its original resource value.

A scale up policy setting 184 must be specified for all virtual functions that want to obtain extra resources from the adapter and hypervisor, and the user may select one of the three policies described for the resize policy 174.

A scale up threshold setting 185 is enabled only when scale up policy is selected, and this value indicates the maximum threshold resources percentage for a scale up operation. No scale up is permitted if it exceeds the resources below this threshold 185. The value of the scale up threshold setting 185 is relative to original resources allocated to this VF, and for example, defaults to 200% of original VF resource allocation. This means that at maximum a SRIOV virtual function may be scaled up to 200% of its original resource value.

In FIG. 1B, example hardware facilities and functions 186 are shown for implementing dynamic resizing of a Single Root Input/Output Virtualization (SRIOV) virtual function (VF) in a SRIOV adapter 102 in accordance with the preferred embodiment. The hardware facilities and functions 186 include a usage statistics check agent 187 that runs on the management channel side and periodically gathers VF statistics from the SRIOV adapter 102, and also converts statistics to usage information as per a selected algorithm. The usage information obtained is used by the agent 187 to predict VF usage in a next interval.

The hardware facilities and functions 186 include scale down and scale up event commands 188 that are send to the hypervisor 116 for resizing a specific VF. The hardware facilities and functions 186 include DMA windows 190 for each active SRIOV VF, PF and VF drivers, and MMIO windows 192 for each active SRIOV VF, PF and VF drivers.

Computer system 100 is shown in simplified form sufficient for understanding the present invention. The illustrated computer system 100 is not intended to imply architectural or functional limitations. The present invention can be used with various hardware implementations and systems and various other internal hardware devices.

Figure 2:
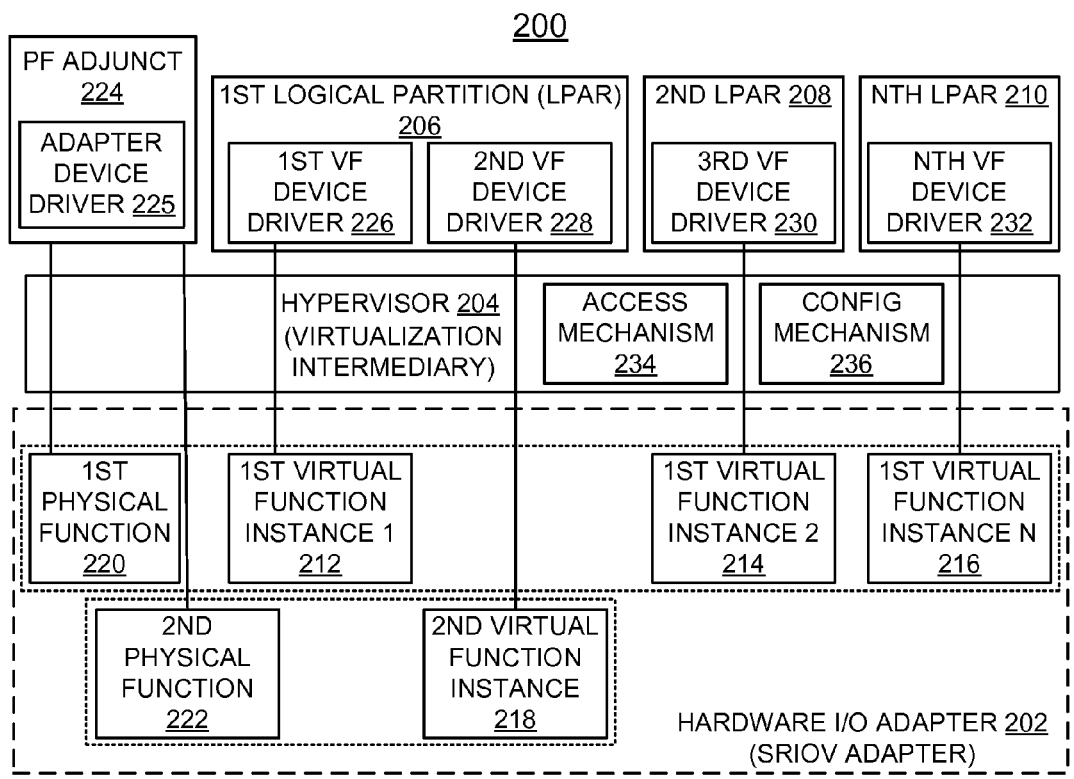

Referring to FIG. 2, there is shown another example system generally designated by the reference character 200 for implementing dynamic resizing of a Single Root Input/Output Virtualization (SRIOV) virtual function (VF) in a SRIOV adapter 102 in accordance with the preferred embodiments.

System 200 includes a hypervisor 204 or other virtualization intermediary, used to enable multiple logical partitions to access virtual functions provided by hardware that includes the hardware I/O adapter 202. For example, as shown in FIG. 2, the hypervisor 204 is used to enable a first logical partition 206, a second logical partition 208, and an Nth logical partition 210, to access a plurality of virtual functions 212, 214, 216, 218 that are provided by the hardware I/O adapter 202. For example, the hypervisor 204 used a first physical function 220 of the hardware I/O adapter 202 to provide a first instance of a first virtual function 212, a second instance of a first virtual function 214, and an Nth instance of a first virtual function 216 to the logical partitions 206, 208, 210. As shown the hypervisor 204 uses a second physical function 222 of the hardware I/O adapter 202 to provide a second virtual function 218 to the logical partitions 206, 208, 210.

The physical functions 220, 222 advantageously include PCI functions, supporting single root I/O virtualization capabilities. Each of the virtual functions 212, 214, 216, 218 is associated with one of the physical functions 220, 222 and adapted to share one or more physical resources of the hardware I/O adapter 202. Each of the virtual functions (VFs) 212, 214, 216, 218 includes the enable resize setting 181 that governs whether the VF is resizable or not.

Software functions or modules, such as a physical function (PF) adjunct 224 including an adapter device driver 225, is provided with the hypervisor 204 for managing the physical functions 220, 222 and the virtual functions (VFs) 212, 214, 216, 218. For example, a user may specify a particular configuration and a particular resizing policy 174 and the hypervisor 204 uses the PF adjunct 224 to configure and dynamically resize the virtual functions 212, 214, 216, 218 from the physical functions 220, 222.

For example, in operation the hypervisor 204 with the PF adjunct 224 enables the first virtual function instances 212, 214, 216 from the first physical function 220. The hypervisor 204 with the PF adjunct 224 enables the second virtual function 218 from the second physical function 222. The virtual functions 212, 214, 216, 218 are enabled, for example, based on a user provided configuration and are dynamically resized based on VF usage. Each of the logical partitions 206, 208, 210 may execute an operating system (not shown) and client applications (not shown).

As shown, the client applications that execute at the logical partitions 206, 208, 210 perform virtual input/output operations and include a respective device driver to directly manage an associated virtual function. For example, a first client application executing at the first logical partition 206 may include a first client VF device driver 226, and a second client application executing at the first logical partition 206 may include a second client VF device driver 228.

As shown, the first client VF device driver 226 accesses the first instance of the first virtual function 212. The second client virtual VF device driver 228 accesses the second virtual function 218. A third client VF device driver 230 executing at the second logical partition 208 accesses the second instance of the first virtual function 214. An Nth client VF device driver 232 executing at the Nth logical partition 210 accesses the Nth instance of the first virtual function 216. An access mechanism 234 and a configuration mechanism 236 are provided with the hypervisor 204 to associate a logical partition with an accessed virtual function. The hypervisor 204 uses the access mechanism 234 to enable logical partitions, such as LPAR 206 to access configuration space associated with one or more of the virtual functions 212, 214, 216, 218.

System 200 is shown in simplified form sufficient for understanding the present invention. The illustrated system 200 is not intended to imply architectural or functional limitations. The present invention can be used with various hardware implementations and systems and various other internal hardware devices.

In accordance with features of the invention, the hypervisor 204 supports the new types of events of the invention, the scale down and scale up events originating from the management function. The hypervisor 204 relays the scale down and scale up events to the VF device driver 226 to allow the VF device driver to resize resource ranges. The hypervisor 204 relays the scale down and scale up events to the PF device driver 225 to allow the PF device driver to resize adapter resource ranges.

In accordance with features of the invention, the PF device driver 225 receives the scale up and scale down events from the hypervisor and relays the events to the SRIOV adapter 102. The PF device driver notifies the hypervisor of the success or failure of resize operation. The PF device driver 225 reserves extra DMA and MMIO buffers for the VF, while the extra DMA and MMIO buffers are only reserved and not used until the hypervisor 204 requests the PF device driver (DD) to start using the same.

In accordance with features of the invention, the VF device driver 226 receives the scale up and scale down events from the hypervisor 204 and applies the new ranges for DMA and MMIO after successful handling of current transaction without stopping the VF 212. The VF device driver 226 notifies the hypervisor 204 of the success or failure of resize operation.

In accordance with features of the invention, dynamic resizing of the SRIOV VF is provided according to their usage statistics collected over a period of time. For example, a user specifies whether a VF may be resized and the upper and lower limits on VF resizing at the time of VF creation. The management function periodically polls the adapter 102 for VF statistics. These statistics are gathered by for all VFs that may be resized. The management function collects statistics for resize poll frequency 173 consecutive intervals. The interval used for polling VFs, resize poll interval 172 is specified by management function administrator when configuring this feature. VF usage is determined by checking what percentage of DMA and MMIO buffers were used in a particular interval.

In accordance with features of the invention, usage information from raw statistics is determined by identifying a percentage of the allocated DMA and MMIO buffers that were used for a particular interval. For instance if for a particular second interval only 25% DMA buffers and 35% MMIO buffers are being used, the usage % is said to be 30%. The percentage is with reference to the DMA and MMIO space allocated to the specific VF. The usage information is obtained by gathering statistics every resize poll interval 172 and averaging the collected statistics, such as represented by the following equations:

$$DMA\_Usage_t = (Adapter\_DMA\_Stats_t - Adapter\_DMA\_Stats_{t-1})/(resize\_poll\_interval * MAX\_DMA\_FOR\_THIS\_VF\_PER\_POLL\_INTERVAL)$$

$$MMIO\_Usage_t = (Adapter\_MMIO\_Stats_t - Adapter\_MMIO\_Stats_{t-1})/(resize\_poll\_interval * MAX\_MMIO\_FOR\_THIS\_VF\_PER\_POLL\_INTERVAL)$$

Equal weight optionally is given to both DMA and MMIO utilization, and may be configured via a management function option.

In accordance with features of the invention, dynamic resizing of the SRIOV VF is determined based on VF usage. If the usage thus determined is less than the lower usage threshold, a scale down operation is performed. Alternatively if the usage is greater than higher usage threshold, a scale up operation is performed. The resize operation is performed if and only if all the usage values gathered during consecutive resize poll frequency cycles are either all less than lower threshold or all the statistics are higher than higher threshold with no resizing operation being performed for mixed usage. For example, management function initiates a corrective scale up or scale down action and resets the frequency counter. The next statistics gathering phase starts after the scale up/scale down operation is complete. Hence resize poll frequency implies a number of consecutive intervals that a particular pattern should hold. Identifying a number of consecutive intervals pattern for a few cycles before making a resize decision allows the VF to absorb occasional high and low usage blips.

In accordance with features of the invention, usage information for dynamic resizing SRIOV VF is determined based on VF usage history. The past usage patterns are used for predicting future usage and allocating/de-allocating resources based on predicted future usage. Future usage value is calculated on the basis on usage patterns for the past resize poll frequency cycles. Once the average usage value is calculated as described above, the resources are re-sized as per the resize policy 174 set in the management function. The variation of weighted mean approach is used with more emphasis to current history for calculating future usage, such as represented by the following equation:

$$U_N = (N*U_N + (N-1)*U_N + (N-2)*U_N + \ldots + 1*U_1))/(N+(N-1)+(N-2)+\ldots 1)$$

Consider the following formula for usage prediction with resize poll interval value as 5 as follows:

$$U_{T6} = (5*U_{T5} + 4*U_{T4} + 3*U_{T3} + 2*U_{T2} + 1*U_{T1}))/(5+4+3+2+1)$$

For example given the input past usage values of 20, 15, 7, 0, 10

$$U_{T6} = (5*10 + 4*0 + 3*7 + 2*15 + 20)/15 = 8.0$$

Once a usage value is determined, a resize policy 174 is applied to obtain desired resource re-size. Resize policies may be selected from the management function. In the above case the usage is 8% of existing resources. Applying the 3 policies results in following behavior, simple policy uses 75% of existing resources, medium policy uses 25% of existing resources, and aggressive policy uses 10% of existing resources.

Figure 3:
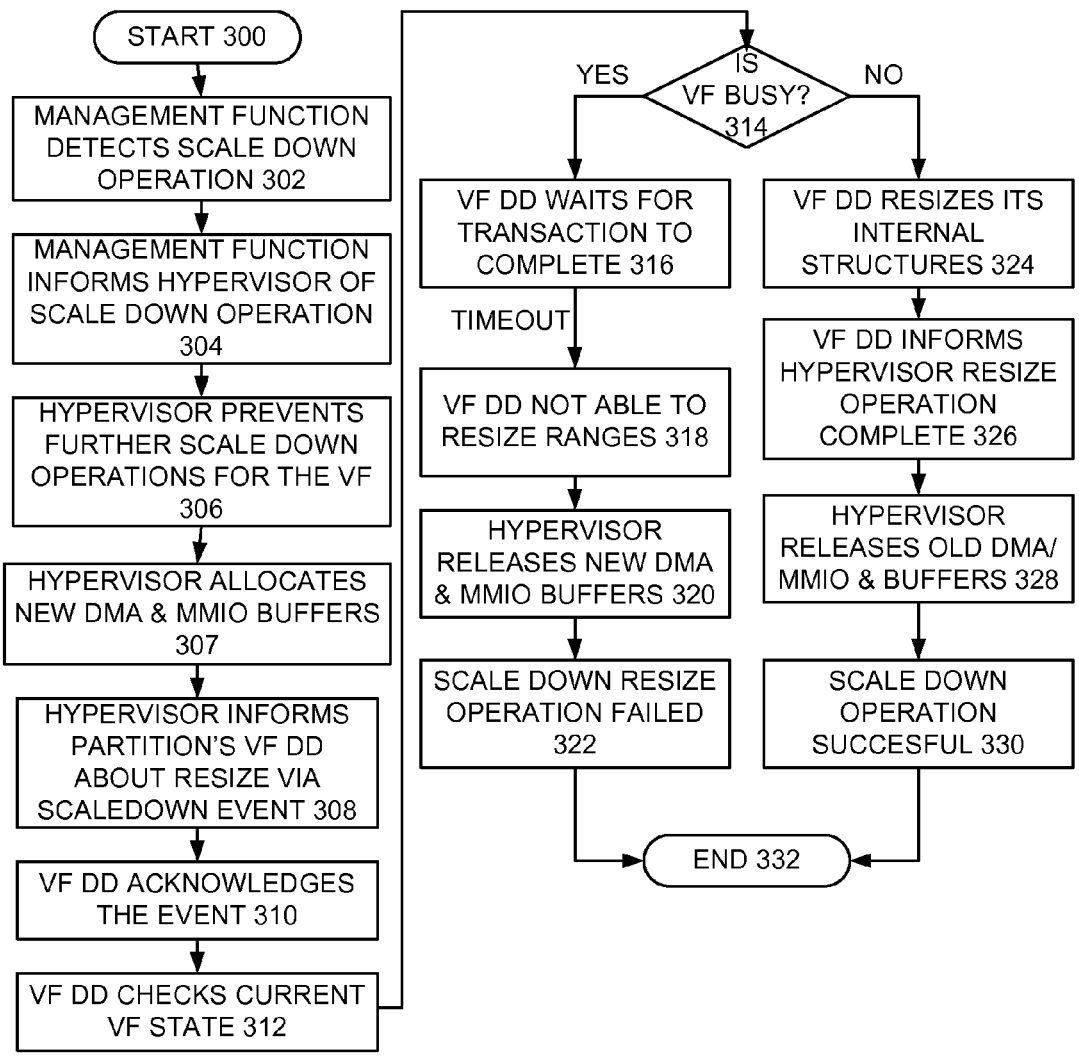
FIGS. 3, 4, and 5 together provide a flow chart illustrating example operations for implementing dynamic resizing of a Single Root Input/Output Virtualization (SRIOV) virtual function (VF) for the SRIOV adapter in accordance with the preferred embodiment.
Figure 4:
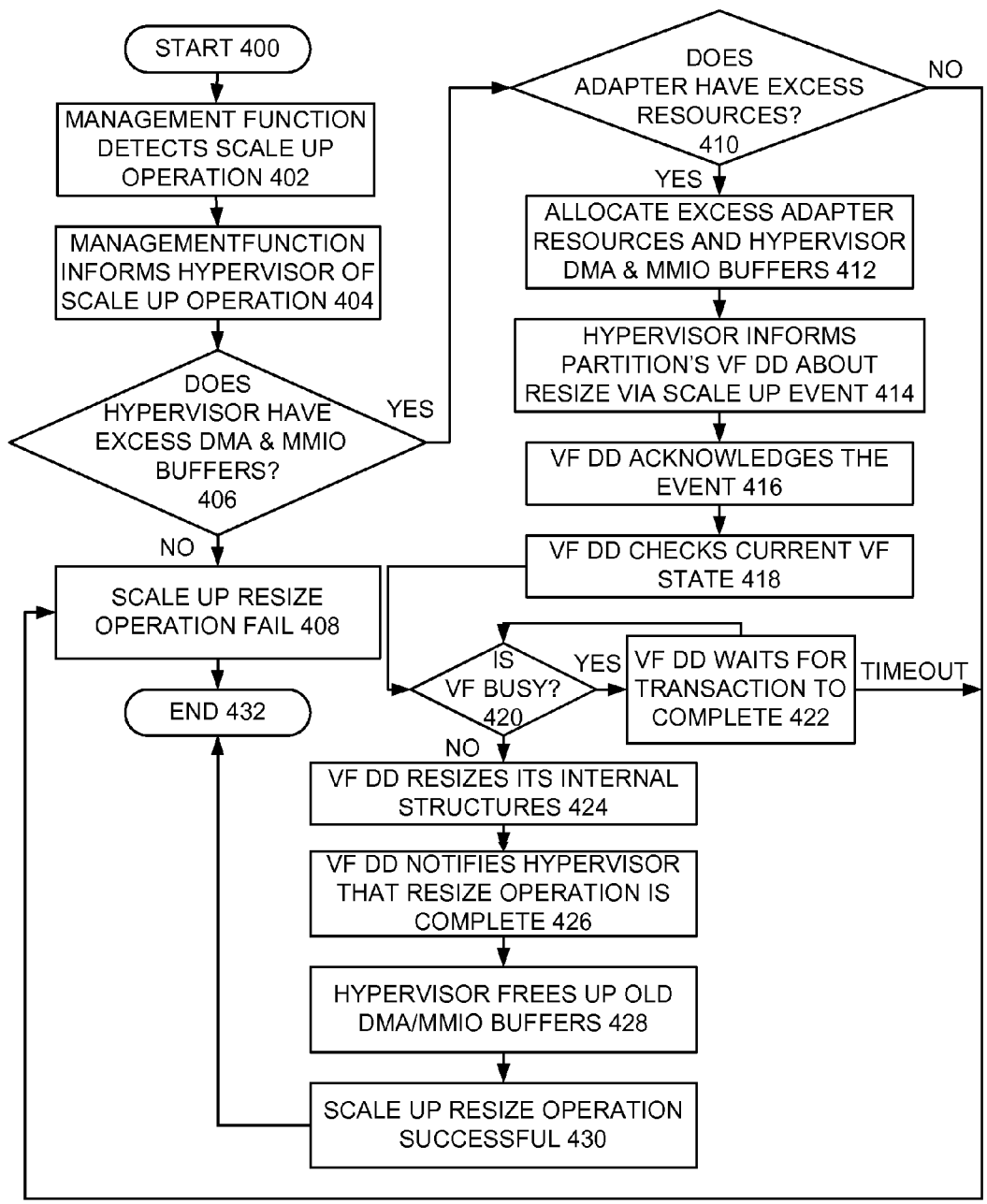
Figure 5:
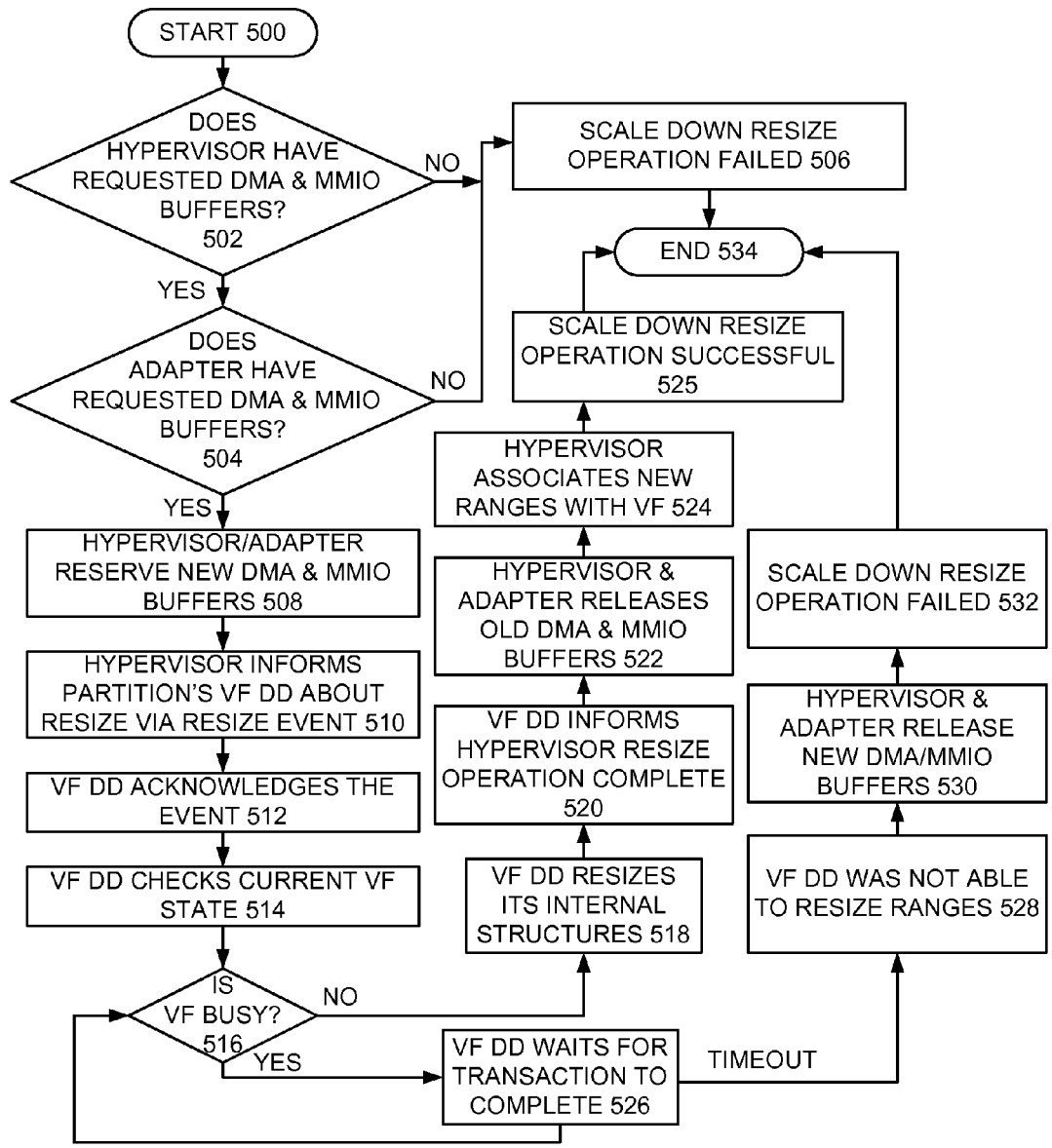

Referring to FIGS. 3, 4, and 5, there are shown exemplary operations of the processing and logic provided by the processor 104 and hypervisor 116 for implementing dynamic resizing of a Single Root Input/Output Virtualization (SRIOV) virtual function (VF) in a SRIOV adapter 102 in accordance with the preferred embodiment.

In FIG. 3, scale down operations start as indicated in a block 300. A scale down operation returns excess DMA and MMIO buffers back to the hypervisor. The corresponding adapter resources are also freed. The binding between the excess resources and the corresponding VF is broken and these resources are returned to the adapter and the hypervisor. These resources may be used for new VFs and/or scale-up operations. The management function detects a scale down operation as indicated in a block 302. The scale down re-size operation starts with management function notifying the hypervisor that the VF is not utilizing its resources effectively and is a candidate for resource reclamation as indicated in a block 304. The hypervisor prevents further scale down operation for this VF as indicated in a block 306. The hypervisor allocates new DMA and MMIO buffers for the VF as indicated in a block 307, and since the previous buffers may be being used at this time, the hypervisor does not free up old DMA and MMIO buffers. As indicated in a block 308 the hypervisor sends an event to the VF DD indicating that the VF DD needs to re-size its DMA and MMIO ranges via the scale down event. The VF driver running in the LPAR acknowledges this event from the hypervisor as indicated in a block 310. The VF device driver checks the current VF state as indicated in a block 312, in order to re-size its buffers to align with the hypervisor. The VF device driver may have to wait for the current transactions to end before resizing its buffers as indicated in a decision block 314 and 316. If the VF device driver is not able to resize the ranges as indicated in a block 318, the hypervisor releases the new DMA and MMIO buffers as indicated in a block 320 and the old VF resources are not changed. The scale down operation has failed as indicated in a block 322. If the VF DD is not able to scale down its resource usage at block 318, the scale down operation fails immediately. Also if the VF DD is able to scale down but the PF device driver is not able to free up adapter resources, the hypervisor sends a scale up event to the VF DD to reinstate its resources to their previous values. The scale down operation is deemed failed in both cases at block 322.

In accordance with features of the invention, if the scale down operation fails multiple times, the management function guards scale down operation for this VF. This is done to prevent CPU cycles when a re-size fails due to hardware problem. Similarly if the VF DD does not send an acknowledgment that VF resize event was successfully or unsuccessfully handled, the hypervisor assumes failure and de-allocates the newly allocated buffers at block 320. This is also another case of scale down operation failing at block 322.

When the VF is not busy, the VF device driver resizes it internal structures as indicated in a block 324. Once the re-size is complete from VF driver perspective, the VF device driver notifies the hypervisor as indicated in a block 326. The hypervisor now releases the old buffers as indicated in a block 328 and also sends a command to PF device driver to use the newly allocated adapter resources. When all three parts are successfully re-sized, the scale down operation is deemed completed and successful as indicated in a block 330, and the excess DMA and MMIO space has been freed from standpoint of the VF, hypervisor and adapter. Operations end as indicated in a block 332.

In FIG. 4, scale up operations start as indicated in a block 300. A scale up operation is performed by allocating more DMA buffers and MMIO space for an active SRIOV VF. Once the management function detects a scale up operation as indicated in a block 402 and the management function decides the percentage of excess DMA and MMIO resources to be allocated. The scale up re-size operation starts with management function notifying the hypervisor as indicated in a block 404. As indicated in a decision block 406, once the hypervisor gets this request, the hypervisor checks if it has excess DMA and MMIO buffers to allocate requested MMIO and DMA space to the VF. If the hypervisor does not have excess buffers that it can allocate, the scale up resize operation fails as indicated in a block 408. If the hypervisor has excess buffers that it can allocate, the hypervisor queries the adapter to check if the adapter can allocate resources for this VF as indicated in a decision block 410. If either check fails due to resource limitation, the scale up call returns a failure to the management function and the operations end as indicated in a block 432.

In case of success, the hypervisor allocates excess DMA and MMIO buffers as indicated in a block 412. After that the hypervisor informs the VF DD of its new DMA and MMIO ranges via a scale up event as indicated in a block 414. The VF DD acknowledges the event as indicated in a block 416. Checking if the VF is busy is performed as indicated in a block 418. As indicated in a decision block 420, if the VF is busy, the VF waits for the ongoing transaction to complete before resizing its resources as indicated in a block 422. When the VF is not busy, the VF device driver resizes it internal structures as indicated in a block 424. Once the re-size is complete from VF driver perspective, the VF device driver notifies the hypervisor as indicated in a block 426. The hypervisor now releases the old buffers as indicated in a block 428 and also sends a command to PF device driver to use the newly allocated adapter resources. When all three parts are successfully re-sized, the scale up operation is deemed completed and successful as indicated in a block 430, and the excess DMA and MMIO space has been freed from VF, hypervisor and adapter standpoint. At this time the VF has been re-sized from adapter and hypervisor perspective. Operations end as indicated in a block 432.

In accordance with features of the invention, in case of failures, the management function may try again after some time. If a scale up failure threshold specified in the management layer is reached, the VF is effectively locked for scale-up operation.

In accordance with features of the invention, in case of DMA and MMIO requests when a resize operation is in progress, requests originating from adapter 102 or LPAR will hit hypervisor in 3 cases as follows:
1. Both PF device driver and VF device driver using new MMIO/DMA ranges;
2. Both PF device driver and VF device driver using old MMIO/DMA ranges; and
3. VF DD using the new ranges while PF DD is using the old DMA/MMIO ranges.

In accordance with features of the invention, any requests that originate from the adapter while the resize is going on can hit the VF DD. If this request hits the VF when the old ranges are being used, the old ranges will be used for this transaction. If the adapter request hits when the VF is using new ranges and the adapter is using new ranges, the transaction will use new ranges. When the VF has resized to the new DMA/MMIO ranges while the hypervisor has requested or is in the process of requesting PF DD to use the new ranges, at this time the hypervisor has not yet freed up old memory and the PF DD is using the old ranges. This situation is prevented from arising by effectively locking DMA/MMIO operations between VF resize and hypervisor resize completion. Note that outstanding MMIO operations are processes before the VF has resized.

In accordance with features of the invention, error handling is very important for both scale down and scale up resize operations since there are multiple components involved and the failure of one component to properly resize impacts the success of the operation. As such the entire error handling is based on two main concepts, first requiring verification that all resize operations complete successfully for the entire operation to be successful and second in case of failures, roll back any changes made.

In accordance with features of the invention, error handling includes for the simplification of implementation an assumption that the VF scale up operation will never fail. The reasoning behind the assumption is that the VF range is just a number and since we are increasing the number from original value, this operation should never fail. The algorithm makes sure that all outstanding requests have been processed while the VF resize operation is being performed. Locking is used to make sure that only one VF is being resized at one time. Also this VF is locked and does not accept any requests while the resize is ongoing so that any application that tries to use this VF gets a Try-again error. The same error handling algorithm is used for scale up and scale down error handling.

In FIG. 5, error handling operations start as indicated in a block 500. After the resize operation is received by hypervisor and the hypervisor checks whether it has enough buffers for resizing as indicated in a decision block 502. The hypervisor checks whether the adapter has enough buffers for resizing as indicated in a decision block 504. If the hypervisor or the adapter does not have extra buffers, the operation fails here as indicated in a block 506. If both the adapter and hypervisor have excess buffers, excess buffers are reserved as indicated in a block 508.

On successful reservation, the hypervisor sends a message to the VF DD that it should resize its buffers via a resize event as indicated in a block 510. Then the VF DD acknowledges the event as indicated in a block 512. The VF device driver checks the current VF state as indicated in a block 514. When determined that the VF is not busy as indicated in a decision block 516, the VF device driver resizes it internal structures as indicated in a block 518. Once the re-size is complete from VF driver perspective, the VF device driver notifies the hypervisor as indicated in a block 520. The hypervisor and adapter now release the old buffers as indicated in a block 522 and the hypervisor associates the newly allocated adapter resources with the VF as indicated in a block 524. The scale down resize operation is successful as indicated in a block 525. Operations end as indicated in a block 534.

When determined that the VF is busy at decision block 516, the VF DD waits for the transaction to complete as indicated in a block 526. If a timeout occurs, the VF DD is not able to resize in a given time as indicated in a block 528, the hypervisor and adapter now release the new buffers as indicated in a block 530 and the scale down resize operation has failed as indicated in a block 532. When the VF DD returns a failure and the hypervisor and adapter free the new buffers. When the hypervisor does not receive a response from the partition within the set timeout seconds, the hypervisor assumes failure and frees up the new buffers and operations end at block 534.

Figure 6:
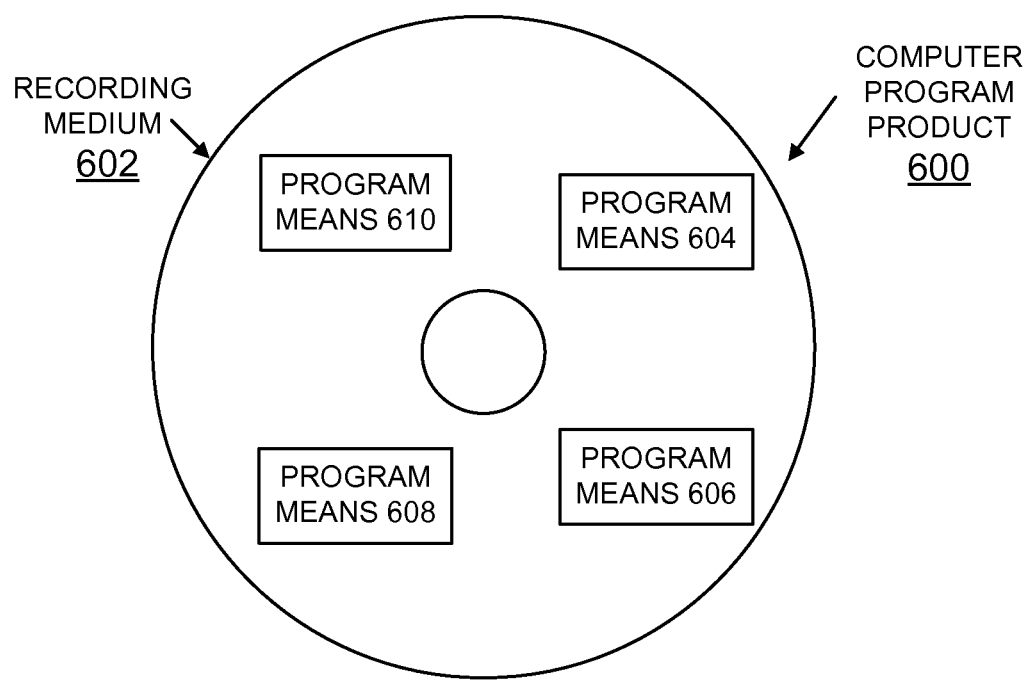
FIG. 6 is a block diagram illustrating a computer program product in accordance with the preferred embodiment.

Referring now to FIG. 6, an article of manufacture or a computer program product 600 of the invention is illustrated. The computer program product 600 is tangibly embodied on a non-transitory computer readable storage medium that includes a recording medium 602, such as, a floppy disk, a high capacity read only memory in the form of an optically read compact disk or CD-ROM, a tape, or another similar computer program product. Recording medium 602 stores program means 604, 606, 608, and 610 on the medium 602 for carrying out the methods for implementing concurrent adapter firmware update for an I/O adapter, such as a Single Root Input/Output Virtualization (SRIOV) adapter of a preferred embodiment in the system 100 of FIG. 1, or system 200 of FIG. 2.

A sequence of program instructions or a logical assembly of one or more interrelated modules defined by the recorded program means 606, 606, 608, and 610, direct the computer system 600 for implementing concurrent adapter firmware update for an I/O adapter, such as a Single Root Input/Output Virtualization (SRIOV) adapter of a preferred embodiment.

While the present invention has been described with reference to the details of the embodiments of the invention shown in the drawing, these details are not intended to limit the scope of the invention as claimed in the appended claims.

What is claimed is:

1. A system for implementing dynamic resizing of a Single Root Input/Output Virtualization (SRIOV) virtual function (VF) in a SRIOV adapter in a computer system comprising:
   the SRIOV adapter comprising a plurality of virtual functions (VFs), and a physical function (PF) containing said plurality of virtual functions (VFs);
   a processor;
   at least one logical partition (LPAR) coupled to the processor;
   a virtual function (VF) device driver provided with the LPAR;
   a management function and a hypervisor managing allocation of resources to each LPAR and managing functions associated with the SRIOV adapter including the SRIOV PF and VFs;
   a hypervisor managing functions associated with the SRIOV adapter;
   said processor using said management function and said hypervisor to perform the steps of:
       enabling the virtual function (VF) to be dynamically resizable;
       determining SRIOV virtual function (VF) usage for the SRIOV virtual function (VF) to be resized based on adapter statistics;
       generating a resize event to selectively scale-up or scale down VF resources based upon the SRIOV virtual function (VF) usage;
       allocating, by the hypervisor, new direct memory access (DMA) and memory management input output (MIMO) buffers for the VF;
       performing the resize event, the resize event including the steps of:
           checking, by the VF driver, a current VF state and determining whether the VF is busy;
           in response to determining that the VF is not busy,
               resizing, by the VF driver, the internal structures of said VF driver,
               notifying the hypervisor of the completion of the resizing; and
               in response to the notification, said hypervisor freeing old DMA and MMIO buffers allocated to the VF and issuing a command to use the new DMA and MIMO buffers,
           in response to determining that the VF is busy,
               notifying the hypervisor of an inability to complete the resize event based on determining that a predetermined wait threshold has been reached, and
               in response to the notification, releasing, by said hypervisor, the new DMA and MIMO buffers.

2. The system as recited in claim 1, wherein said management function and said hypervisor include control code tangibly embodied in a non-transitory machine readable medium used for implementing dynamic resizing of the SRIOV VF.

3. The system as recited in claim 1, said hypervisor further includes a respective virtual function (VF) device driver coupled to SRIOV VFs; and
   wherein said hypervisor communicates the resize event to an associated SRIOV VF device driver.

4. The system as recited in claim 1, said hypervisor further includes a respective physical function (PF) device driver coupled to SRIOV PF;
   and wherein said hypervisor communicates the resize event to an associated SRIOV PF device driver.

5. The system as recited in claim 1, wherein generating the resize event to selectively scale-up or scale down VF resources includes said processor using said management function for periodically querying the SRIOV adapter for activity statistics for each SRIOV virtual function (VF) enabled to be resized, and said processor using said management function calculating VF resource usage based on the activity statistics and using the calculated VF resource usage to determine whether VF resources need to be scaled-up or scaled-down.

6. The system as recited in claim 5, includes said hypervisor sending the corresponding resize event to a hypervisor based physical function (PF) device driver and a partition based virtual function (VF) device driver.

7. The system as recited in claim 6, includes responsive to a successful resize operation, using new direct memory access (DMA) buffers and new memory management input output (MMIO) buffers for the resize event.

8. The system as recited in claim 6, includes responsive to a failed resize operation, keeping current direct memory access (DMA) buffers and current memory management input output (MMIO) buffers used before the failed resize event.

9. The system as recited in claim 6, includes dynamically modifying direct memory access (DMA) windows and dynamically modify memory management input output (MMIO) windows for the SRIOV virtual function (VF) resource.

10. The system as recited in claim 1, includes said processor using said management function and said hypervisor to perform the steps of determining SRIOV virtual function usage based on collecting adapter usage statistics for a plurality of resize pole intervals and averaging the collected usage statistics.

* * * * *